United States Patent [19]

Turner et al.

[11] Patent Number: 4,821,744

[45] Date of Patent: Apr. 18, 1989

[54] BELTED GRAIN ACCELERATOR FOR A THRESHING MACHINE

[75] Inventors: Reed J. Turner, East Moline; Bruce Coers, Silvis, both of Ill.

[73] Assignee: Deere & Company, Moline, Ill.

[21] Appl. No.: 68,072

[22] Filed: Jun. 30, 1987

[51] Int. Cl.[4] .............................................. A01F 12/48
[52] U.S. Cl. ............................. 130/27 HF; 130/27 R; 130/27 T
[58] Field of Search .............. 130/27 R, 27 T, 27 HF, 130/27 Z, DIG. 5; 56/14.6, 16.5

[56] References Cited

U.S. PATENT DOCUMENTS

| | | | |
|---|---|---|---|
| 2,589,440 | 3/1952 | Shappe | 130/27 R |
| 2,970,599 | 2/1961 | Jeantil | 130/27 R |
| 3,456,786 | 7/1969 | Lee | 130/27 R |
| 3,635,336 | 1/1972 | Chapman | 209/3 |
| 3,800,804 | 4/1974 | Boone | 130/27 HF |
| 4,007,744 | 2/1977 | Shaver | 130/24 |
| 4,103,691 | 8/1978 | Shaver | 130/27 Q |
| 4,444,208 | 4/1984 | Raineri | 130/27 R |
| 4,627,446 | 12/1986 | Huhman | 130/27 Z |

FOREIGN PATENT DOCUMENTS 954044  8/1982  U.S.S.R. ............................ 56/27 Q

OTHER PUBLICATIONS

Transactions of the ASAE, 1970, "Aerodynamic Separation in a Combine Shoe," D. W. Rumble and J. H. A. Lee.
Transactions of the ASAE, 1966, "Pneumatic Separation of Grain and Straw Mixtures," J. B. Uhl and B. J. Lamp.
Canadian Agricultural Engineering, vol. 15, No. 2, Dec. 1973, "Aerodynamic Separation of Grain from Straw and Chaff in a Dispersed Stream, " G. C. Misener and J. H. A. Lee.

Primary Examiner—John Weiss

[57] ABSTRACT

A gull wing shaped diverted is positioned in an opening between two oppositely rotated endless belted conveyors having transverse paddles for propelling grain and chaff falling from the threshing and separating means downwardly. A blower means forms a substantially horizontal air stream that is directed against the substantially downwardly propelled gain and chaff to separate the lighter chaff from the heavier grain. The blower can comprise one fan assembly or two and provide an air stream to the cleaning shoe assembly.

12 Claims, 1 Drawing Sheet

BELTED GRAIN ACCELERATOR FOR A THRESHING MACHINE

BACKGROUND OF THE INVENTION

1. Field of the Invention

The invention is directed to a belted conveyor system having a gull wing shaped diverter for directing grain and chaff downwardly from the conveyor system through a horizontally flowing air stream.

2. Description of the Prior Art

In threshing a harvested crop, the grain is separated from the straw and chaff and deposited into a holding tank. With conventional combines, the harvested crop is directed to a transversely mounted threshing cylinder and concave which threshes the crop separating the grain from the straw. The residue was then directed to a beater further separating the grain from the straw. The straw residue is then passed over oscillating apertured straw walkers which direct the straw out of the back of the combine while allowing additional grain to fall through the apertures. Grain and chaff falling from the threshing concave and straw walkers is directed to a cleaning shoe for separating the chaff from the grain. A blower assembly is used in this final step to blow the lighter chaff away from the heavier grain.

In an axial flow combine, the grain is directed to a cylindrical tube housing a rotor. The harvested crop is threshed and separated in the cylindrical tube with the grain and chaff falling therefrom in a manner similar to the conventional combine. A hybrid machine was disclosed by the assignee of the present application, in U.S. Pat. No. 4,574,815, wherein a conventional transverse concave and threshing cylinder is used in conjunction with an axial separator.

With all of these machines, but especially with axially flow machines separating chaff from the grain has become a difficult problem. One method that has been proposed to overcome this problem is to increase the downward velocity of the downwardly falling grain and chaff and direct a horizontal air stream into the falling material, see U.S. Pat. No. 4,007,744 and 4,103,691.

SUMMARY OF THE INVENTION

The present invention comprises two oppositely rotating endless belt conveyors that transmit the grains and chaff to an opening from which it is propelled downwardly. A gull-wing shaped diverter is positioned in the opening so that its vertex is positioned in the middle of the opening and each wing overlies one of the conveyors. The conveyor belts are provided with a series of transverse paddles which propel the grain and chaff downwardly. The transverse bars approach, but do not contact the diverter wings as they pass. The wings prevent grain from free falling into the blower air stream without being accelerated by the transverse bars. The grain is propelled downwardly with a forward component to increase the relative vector difference of the air stream and grain flow.

DETAILED DESCRIPTION

Figure 1:
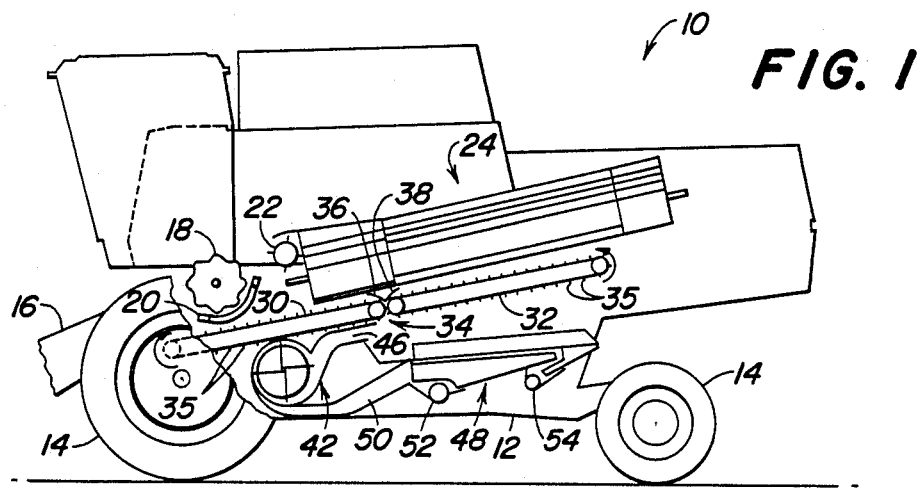
FIG. 1 is a semi-schematic side view of a combine having an axial flow separator and an endless belt accelerator.

FIG. 1 illustrates a self-propelled combine 10 having supporting structure 12 from which depend ground engaging wheels 14. The ground engaging wheels are driven by a propulsion means (not shown) for moving the combine across a field. The forward part of the combine would normally be provided with a harvesting platform for harvesting a crop in a field and directing the crop up through feeder house 16 to the threshing and separating means. The threashing and separating means comprises threshing cylinder 18 and associated concave 20 to which the crop is initially directed. The threshed crop is then directed to beater 22 from which it enters axial separator 24. Axial separator 24 is better described in U.S. Pat. No. 4,574,815 which is incorpoated herein by reference. It is important to note that the present invention would also work with conventional straw walkers or a straight axial flow machine and as such it should not be limited to any particular machine configuration.

Grain and chaff falling from the threshing and separating means falls onto endless belted conveyors 30 and 32. The conveyors together define opening 34 through which the grain and chaff are accelerated. The belts are oppositely rotated as illustrated by the arrows in FIG. 2, and are provided with a series of transverse bars 35 that are secured to the conveyor belt.

The transverse bars act to accelerate the grain and chaff located on the conveyors downwardly through opening 34. A gull wing shaped diverter is positioned across the opening and is provided with concave wings 36 and 38 which intersect at vertex 40. The vertex of the diverter extends into the opening. As the conveyors are rotated, the transverse bars approach, but do not come into contact with the undersides of the wing. The wings prevent the grain from free falling through the opening without being accelerated by the transverse bars.

Immediately below conveyor 30 is blower 42. Blower 42 is provided with outlet duct 46 for directing an airstream against the grain and chaff being propelled through the opening. The heavier grain falls onto cleaning shoe assembly 48 where it is further processed. The lighter chaff is blown away out the end of the combine. In the FIG. 1 configuration, only one blower is used and this blower is provided with a second duct 50 for directing the air stream through the cleaning shoe assembly. The cleaning shoe assembly is relatively conventional and directs grain to clean grain auger 52 and tailings (that is unthreshed grain heads) to tailings auger 54.

Figure 3:
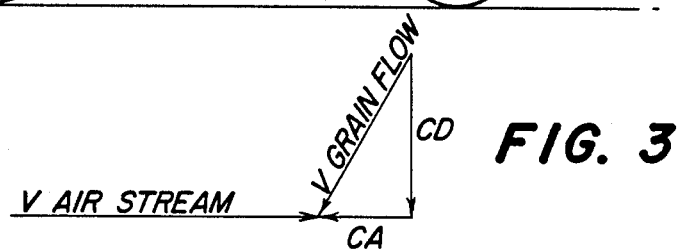
FIG. 3 is a schematic side view of the grain flow and air flow.

As illustrated in FIG. 3, it maybe desirable to increase the relative velocity vector between the air stream and the grain flow. As illustrated in FIG. 3, the grain is propelled downwardly and forwardly into the air stream. Therefore, the grain is not merely propelled perpendicularly to the air stream as is grain velocity component CD, but rather at an oblique angle so that velocity component CA of the grain flow moves in the opposite direction of the air stream.

Figure 2:
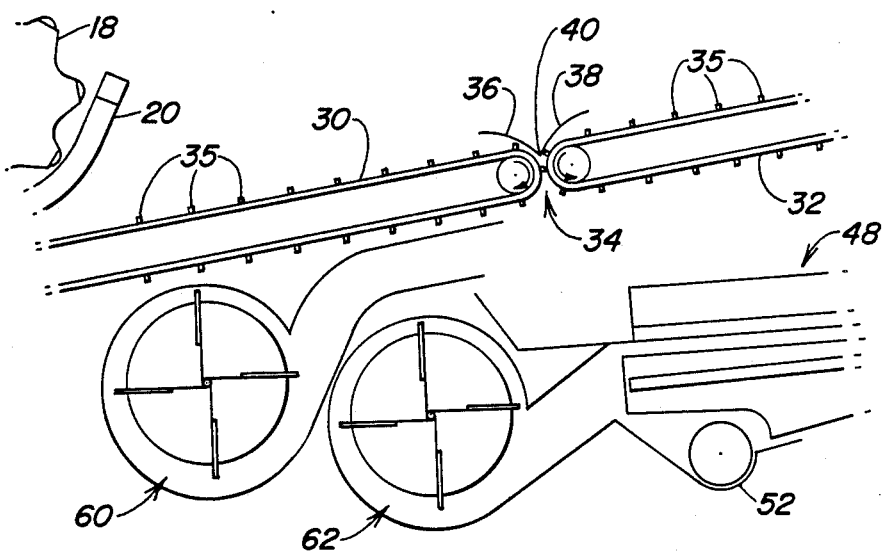
FIG. 2 is a semi-schematic side view of a combine having two blowers, one for the accelerated chaff and grain and the other for the cleaning shoe.

In the embodiment illustrated in FIG. 2, a two blower system is used, wherein blower 60 is used for directing a horizontal air stream against the grain and chaff as it is propelled through opening 34, and blower 62 is used to supply an air stream to the cleaning shoe assembly.

The subject invention should not be limited to the abovedescribed embodiments, but should be limited solely to the claims that follow.

We claim:

1. In a grain thresher having a threshing cylinder and an associated concave, and a separation means for separating straw from grain, the combination comprising:
    a pair of belted endless conveyors extending beneath the concave and separator means for receiving grain and chaff falling from the concave and separator means:
    power means for driving the conveyors in opposite directions whereby the grain and chaff deposited on the conveyors from the separator means and concave are directed to an opening between the conveyors through which the chaff and grain is accelerated in a substantially downwardly direction;
    a gull wing shaped diverter located above the opening wherein each wing of the diverter extends above one of the conveyors and the vertex of the diverter extends into the opening between the two conveyors; and
    a blower means directing a substantially horizontal flow of air through the accelerated chaff and grain to blow the falling chaff away from the falling grain.

2. Th combination as defined by claim 1 wherein each of the belted endless conveyors are provided with a series of transversely extending paddles for downwardly propelling the chaff and grain through the opening.

3. The combination as defined by claim 2, wherein the transversely extending paddles accelerate the chaff and grain in a substantially downward direction having a velocity component opposite to the velocity component of the air stream of the blower means.

4. The combination as defined by claim 2 wherein the transversely extending paddles cooperate with the gull wing shaped diverter to prevent the free fall of grain without being accelerated.

5. A self-propelled agricultural combine for harvesting a crop from a field and threshing the crop to separate grain from the straw and chaff, the self-propelled combine comprising:
    a supporting structure having ground engaging wheels for supporting the supporting structure and driving the supporting structure across a field;
    a propulsion means for driving the ground engaging wheels;
    a thresholding and separator means mounted on the supporting structure for separating grain from straw and chaff;
    a harvesting means for collecting crop from a field and directing it to the threshing and separating means, the harvesting means and the threshing and separating means are all powered by the propulsion means;
    an accelerator means for accelerating the grain and chaff falling from the threshing and separator means, the accelerator means comprising two belted endless conveyors extending beneath the threshing and separating means for receiving grain and chaff falling from therefrom, the conveyors are driven in opposite directions by the propulsion means whereby the grain and chaff deposited on the conveyors are directed to an opening between the conveyors through which the chaff and grain is accelerated in a downward and forward direction and a diverter having two concave portions that intersect forming a vertex, the vertex of the diverter is positioned in the opening between the two conveyors and each concave portion extends over one of the conveyors; and
    a blower means directing a substantially horizontal flow of air rearwardly through the accelerated chaff and grain to blow the falling chaff away from the falling grain.

6. A self-propelled combine as defined by claim 5 wherein each of the belted endless conveyors is provided with a series transversely extending paddles for downwardly propelling the grain and chaff through the opening, which cooperate with the diverter to prevent the free fall of grain therethrough without being accelerated.

7. A self-propelled combine as defined by claim 6 wherein the blower means comprises a fan having a first and second outlet duct, the first outlet duct directs a substantially horizontal air stream against the chaff and grain being propelled through the opening formed by the two conveyors, the second duct directs an air stream to a cleaning shoe assembly.

8. A self-propelled combine as defined by claim 6 wherein the blower means comprises two fan assemblies, the first fan assembly is provided with an outlet duct for directing a substantially horizontal air stream against the chaff and grain being propelled through the opening formed by the two conveyors, the second fan assembly is provided with an outlet duct for directing an air stream to a cleaning shoe assembly.

9. An agricultural combine for harvesting a crop from a field and threshing and separating the grain contained in that crop from straw and chaff, the combine comprising:
    a supporting structure having ground engaging wheels for supporting the supporting structure;
    a threshing and separator means mounted on the supporting structure for separating grain from straw and chaff;
    a harvesting means for collecting crop from a field and directing it to the threshing and separating means, the harvesting means and the threshing and separating means are all powered by the propulsion means;
    an accelerator means for accelerating the grain and chaff falling from the threshing an separator means, the accelerator means comprising at least one belted endless conveyor extending beneath the threshing and separating means for receiving grain and chaff falling from therefrom, the conveyor is provided with transverse paddles and is driven by a power means whereby the grain and chaff deposited on the conveyor is directed through an opening by the conveyor and the transverse paddles, through which the chaff and the grain is accelerated in a substantially downwardly direction and a diverter having a concave wing which is positioned in the opening adjacent to the conveyor so that the concave wing extends over the conveyor, and the transverse paddles pass the diverter; and
    a blower means directing an air stream through the accelerated chaff and grain to blow the falling chaff away from the falling grain.

10. A combine as defined by claim 9 wherein the blower means comprises a fan having a first and second outlet duct, the first outlet duct directs substantially horizontal air stream against the chaff and grain being propelled through the opening formed by the two conveyors, the second duct directs an air stream to a cleaning shoe assembly.

11. A combine as defined by claim 9 wherein the blower means comprises two fan assemblies, the first fan assembly is provided with an outlet duct for directing a substantially horizontal air stream against the chaff and grain being propelled through the opening formed by the two conveyors, the second fan assembly is provided with an outlet duct for directing an air stream to a cleaning shoe assembly.

12. A combine as defined by claim 9 wherein the accelerator means accelerates the chaff and grain in a substantially downward direction having a velocity component opposite to a velocity component in the air stream of the blower means.

* * * * *